United States Patent
Hadas

(10) Patent No.: US 9,785,257 B2
(45) Date of Patent: Oct. 10, 2017

(54) SHAPE CHANGING DEVICE

(71) Applicant: EMPIRE TECHNOLOGY DEVELOPMENT LLC, Wilmington, DE (US)

(72) Inventor: Noam Hadas, Tel-Aviv (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/916,546

(22) PCT Filed: Oct. 10, 2013

(86) PCT No.: PCT/US2013/064218
§ 371 (c)(1),
(2) Date: Mar. 3, 2016

(87) PCT Pub. No.: WO2015/053775
PCT Pub. Date: Apr. 16, 2015

(65) Prior Publication Data
US 2016/0209941 A1     Jul. 21, 2016

(51) Int. Cl.
*G06F 3/033* (2013.01)
*G06F 3/0354* (2013.01)
*G06F 3/01* (2006.01)

(52) U.S. Cl.
CPC .......... *G06F 3/03543* (2013.01); *G06F 3/011* (2013.01); *G06F 2203/0333* (2013.01)

(58) Field of Classification Search
CPC ............... G06F 3/03543; G06F 3/0354; G06F 3/04886; G06F 3/011; G06F 2203/0333
See application file for complete search history.

(56) References Cited

U.S. PATENT DOCUMENTS

| | | |
|---|---|---|
| 3,738,055 A | 6/1973 | Marble |
| 5,067,834 A | 11/1991 | Szmanda et al. |
| 5,351,066 A | 9/1994 | Rucker et al. |
| 5,439,304 A | 8/1995 | Phillips et al. |
| 5,541,593 A | 7/1996 | Arsem |
| 5,564,844 A | 10/1996 | Patterson, Jr. et al. |
| 6,076,784 A | 6/2000 | Selker |
| 6,259,433 B1 | 7/2001 | Meyers |

(Continued)

OTHER PUBLICATIONS

"3M Ergonomic Optical Mouse—Use multiple devices to alleviate Carpal Tunnel," accessed at http://web.archive.org/web/20101031193427/http://www.jessicazeun.com/index.php/2010/08/3m-ergonomic-optical-mouse/, posted on Aug. 4, 2010, pp. 3.

(Continued)

*Primary Examiner* — Vijay Shankar
(74) *Attorney, Agent, or Firm* — Maschoff Brennan

(57) ABSTRACT

In some examples, a device to facilitate prevention or alleviation of a repetitive motion disorder may include a physical interface and a motor. The physical interface may include a size, a shape, an orientation, and a position. The motor may be operably coupled to the physical interface. The motor may be configured to automatically change at least one of the size, the shape, the orientation, or the position of at least a portion of the physical interface ergonomically and repeatedly during use of the device to facilitate prevention or alleviation of the repetitive motion disorder.

22 Claims, 8 Drawing Sheets

(56) References Cited

U.S. PATENT DOCUMENTS

| | | | |
|---|---|---|---|
| 6,323,843 | B2 | 11/2001 | Giles et al. |
| 6,353,850 | B1 | 3/2002 | Wies et al. |
| 7,194,239 | B2* | 3/2007 | Mantyjarvi ......... G06F 3/04886 341/22 |
| 7,253,803 | B2* | 8/2007 | Schena .................. G01B 5/008 345/156 |
| 7,338,224 | B2* | 3/2008 | Jones ................... G06F 3/0216 235/145 R |
| 7,671,838 | B2 | 3/2010 | Large |
| 7,828,489 | B1 | 11/2010 | Hargreaves et al. |
| 8,212,772 | B2 | 7/2012 | Shahoian |
| 9,448,724 | B2* | 9/2016 | Arnold ............... G06F 3/04886 |
| 2001/0026266 | A1 | 10/2001 | Schena et al. |
| 2001/0033763 | A1 | 10/2001 | Goldstein et al. |
| 2004/0009788 | A1 | 1/2004 | Mantyjarvi et al. |
| 2006/0275069 | A1 | 12/2006 | Jones et al. |
| 2010/0253627 | A1 | 10/2010 | Atzmon |
| 2013/0019191 | A1 | 1/2013 | Arnold |

OTHER PUBLICATIONS

"Mad Catz Cyborg Gaming Mouse Shape Shifts," accessed at http://web.archive.org/web/20121115182147/http://www.techeblog.com/index.php/tech-gadget/mad-catz-cyborg-gaming-mouse-shape-shifts, posted on Jan. 8, 2010, pp. 8.

"Mad Catz R.A.T Mouse Game for Fans (Video)" accessed at https://web.archive.org/web/20130806093553/http://www.apple4.net/mad-catz-r-a-t-mouse-game-for-fans-video/, posted on May 3, 2013, pp. 2.

"Supplemental Information: Hazard Index," accessed at http://web.archive.org/web/20120404025041/http://www.osha.gov/SLTC/etools/electricalcontractors/supplemental/hazardindex.html, accessed on Jan. 14, 2016, pp. 5.

Feathers, D.J., et al., "Alternative computer mouse designs: performance, posture, and subjective evaluations for college students aged 18-25," Work, vol. 44, No. Supplement 1, pp. 115-122 (2013).

International Search Report and Written Opinion for International Application No. PCT/US2013/064218, mailed on Apr. 21, 2014.

Kumar, H., "Razer Ouroboros gaming mouse with shape changing feature," accessed at http://www.gizbot.com/gaming/razer-ouroboros-gaming-mouse-with-shape-changing-feature.html, updated on Jul. 30, 2012, pp. 3.

Leblanc, K.E., and Cestia, W., "Carpal Tunnel Syndrome," American Family Physician, vol. 83, No. 8, pp. 952-958 (Apr. 15, 2011).

McMillan, C.R., "Carpal Tunnel Syndrome: The Rise of an Occupational Illness," accessed at http://web.archive.org/web/20131002154548/http://www.csa.com/discoveryguides/archives/carpal.php, posted on Nov. 1999, pp. 3.

Triano, J.J. and Selby, N.C., "Work Ergonomics: Minimize Back Injuries," accessed at http://web.archive.org/web/20131007030646/http://www.spine-health.com/wellness/ergonomics/work-ergonomics-minimize-back-injuries, accessed on Jan. 14, 2016, pp. 2.

Valachi, B., "Move to Improve Your Health: The Research Behind Static Postures," accessed at http://www.dentistrytoday.com/ergonomics/5361-move-to-improve-your-health-the-research-behind-static-postures, posted on May 9, 2011, pp. 14.

"Keyboards," United States Department of Labor, accessed at http://web.archive.org/web/20130703032605/http://www.osha.gov/SLTC/etools/computerworkstations/components_keyboards.html, accessed on Aug. 5, 2016, pp. 4.

International Search Report and Written Opinion for International Application No. PCT/US2014/033857, mailed on Dec. 17, 2014, pp. 11.

Lendino, J., "Supergonomics: A New Keyboard Shifts Its Shape Automatically to Keep Wrists Healthy," Popsci, accessed at http://web.archive.org/web/20131003234135/http://www.popsci.com/gadgets/article/2011-03/supergonomics-shape-shifting-keyboard-keeps-wrists-healthy, Mar. 22, 2011, pp. 1.

Quick, D., "SmartFish Technologies releases shapeshifting Engage ergonomic keyboard," Gizmag, accessed at http://web.archive.org/web/20130125132723/http://www.gizmag.com/smartfish-engage-ergonomic-keyboard-release-price/17441/, Jan. 3, 2011, pp. 5.

* cited by examiner

SHAPE CHANGING DEVICE

CROSS-REFERENCE TO RELATED APPLICATION

This application is a U.S. National Stage filing under 35 U.S.C §371 of International Application Serial. No. PCT/US2013/064218, filed on Oct. 10, 2013.

BACKGROUND

Unless otherwise indicated herein, the materials described herein are not prior art to the claims in the present application and are not admitted to be prior art by inclusion in this section.

Carpal tunnel syndrome (CTS) is an example of a repetitive motion disorder and one of the fastest growing occupational illnesses in the United States. CTS typically affects the carpal tunnel, which is a collection of tendons on the palmar side of the wrist that are encased by and slide within a synovial sheath that also surrounds the median nerve. When subjected to repeated, limited range motions such as operating a computer mouse, the sheath can swell and fill with fluid. The swelling of the sheath can put pressure on the median nerve and cause paresthesia, pain, numbness, and other symptoms within the wrist, the first three fingers, and the thumb.

Some treatments for CTS target lifestyle modification. For example, the avoidance of repetitive motions, the use of ergonomic equipment, periodic breaks, the use of keyboard alternatives such as a digital pen, voice recognition software, and/or dictation software, and the modification of job functions are often used to manage CTS.

SUMMARY

Technologies described herein generally relate to facilitating prevention or alleviation of repetitive motion disorders.

In some examples, a computer mouse may include a housing and a motor. The motor may be operably coupled to and positioned within the housing. The motor may be configured to automatically change at least one of a size, a shape, an orientation, or a position of at least a portion of the housing ergonomically and repeatedly during use of the computer mouse to facilitate prevention or alleviation of a repetitive motion disorder.

In some examples, a method to facilitate prevention or alleviation of a repetitive motion disorder is described. The method may include receiving operating power. The method may also include automatically changing at least one of a size, a shape, an orientation, or a position of at least a portion of a housing of a computer mouse ergonomically and repeatedly during use of the computer mouse using the operating power.

In some examples, a device to facilitate prevention or alleviation of a repetitive motion disorder may include a physical interface and a motor. The physical interface may include a size, a shape, an orientation, and a position. The motor may be operably coupled to the physical interface. The motor may be configured to automatically change at least one of the size, the shape, the orientation, or the position of at least a portion of the physical interface ergonomically and repeatedly during use of the device to facilitate prevention or alleviation of the repetitive motion disorder.

In some examples, a method to facilitate prevention or alleviation of a repetitive motion disorder associated with using a device having a physical interface is described. The method may include receiving operating power. The method may also include detecting which of a plurality of portions of the physical interface is contacted during use of the device. The method may also include automatically changing at least one of a size, a shape, an orientation, or a position of at least a portion of the physical interface ergonomically and repeatedly during use of the device using the operating power and based on which of the plurality of portions of the physical interface is contacted during the use of the device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
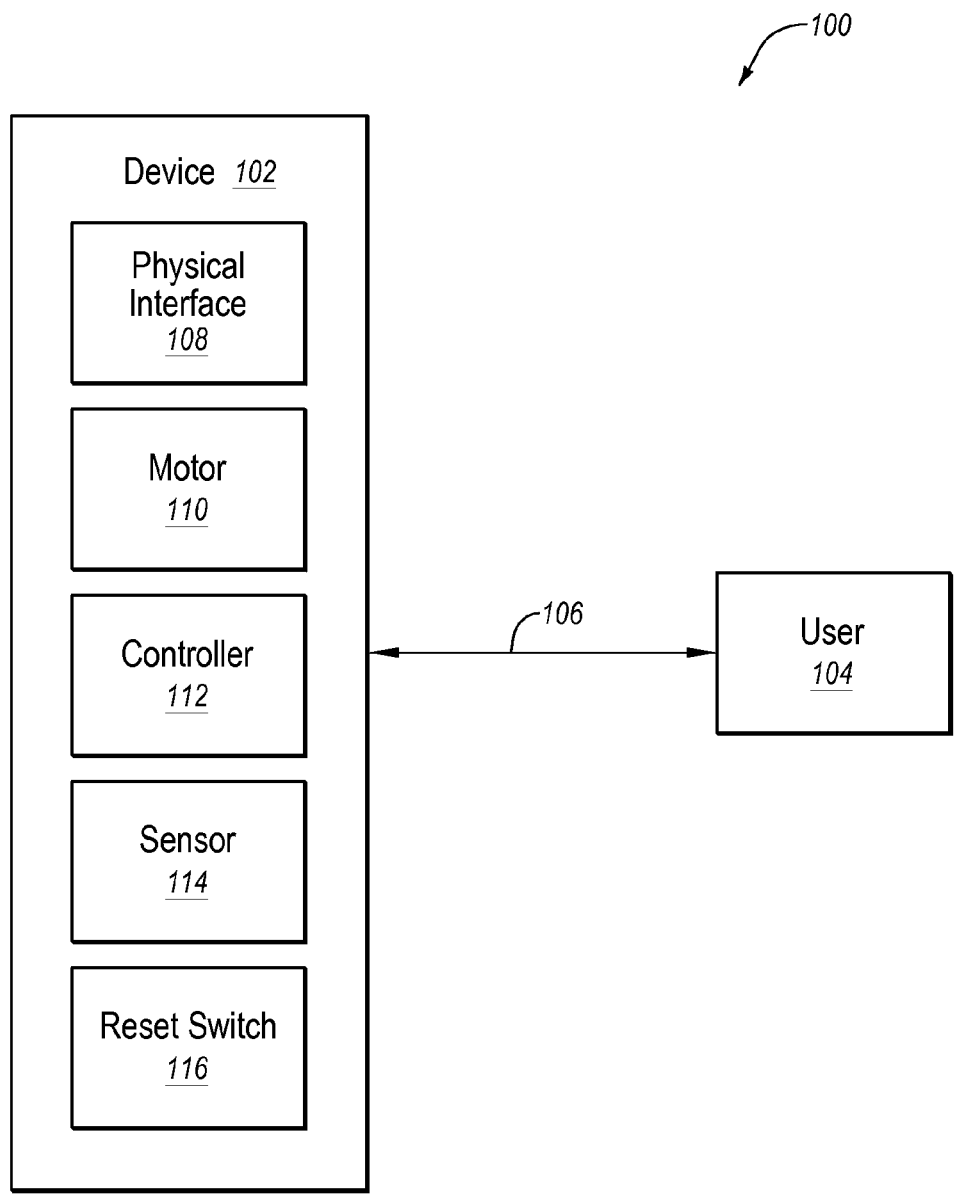
FIG. 1 is a block diagram of an example operating environment in which a device may be used by a user.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

Currently-available options for treating CTS are deficient. For example, ergonomic equipment such as ergonomic keyboards and ergonomic computer mice often look and/or feel alien to users. Thus, users may be reluctant to use such ergonomic equipment.

Additionally, such ergonomic equipment may not fully address the causes of CTS. For instance, currently-available ergonomic equipment generally has a fixed or static size and shape. Thus, while the ergonomic equipment may alter the user's holding and/or using posture compared to more traditional equipment, the static nature of such ergonomic equipment may cause the user to repeat motions. Even though the motions that are repeated while using such ergonomic equipment may be altered, as compared to the motions repeated using more traditional equipment, the motions are still repeated, which may contribute to CTS.

Accordingly, some embodiments described herein generally relate to facilitating prevention or alleviation of repetitive motion disorders. A device such as a computer mouse, a keyboard, a manual or power tool, or other device may have a physical interface such as a housing or a handle. The device may also have a motor operably coupled to the physical interface. The motor may automatically change the physical interface ergonomically and repeatedly in some respect during use of the device to facilitate prevention or alleviation of the repetitive motion disorder. For example, the physical interface may be changed in size, shape, orientation, position, or the like or any combination thereof. Changes in orientation or position of the device, its physical interface, or a portion or component thereof may generally include changes in orientation or position of the device, its physical interface, or the portion or component thereof relative to the user.

Repeatedly changing the physical interface during use of the device may include changing the physical interface more than once during the use of the device. Alternately or additionally, the repeated changes may be cyclic, random, and/or pseudorandom. For example, the physical interface may be automatically changed cyclically by changing the physical interface from one end shape or state to another end shape or state and back again in a cyclic manner. The physical interface may be automatically changed randomly or pseudorandomly through software or other suitable control of the automatic changes to the physical interface.

In some embodiments, the automatic changes may be too slow and/or small in amount to be individually noticed by the user. However, the cumulative effect of the automatic changes over time may be to change, in a continuous or substantially continuous manner or other repeated or dynamic manner, the user's posture, gaze direction, neck angle, finger flex angle, wrist angle, and/or other physiological parameter(s) or a spatial relationship between the user and the device while interacting with the device, which may in turn lower risks associated with operating the device in a static posture for prolonged durations of time. Alternately or additionally, the automatic changes may be relatively fast and/or large in amount, in which case the automatic changes may be individually noticed by the user and/or noticed by the user in aggregate.

The rate (e.g., slow or fast) and/or amount (e.g., small or large) of the changes may depend on the application and/or nature of the repetitive motion disorder to be prevented or alleviated. For example, a device such as a computer mouse or computer keyboard that undergoes automatic changes to alleviate a repetitive motion disorder such as CTS may undergo changes that may be too slow to be noticed with any frequency, even if the changes are relatively large in amount, since relatively faster changes in such a device may annoy the user and/or cause errors, such as typing errors in the case of a keyboard or clicking errors (e g , unintended clicks and/or intended but missed clicks) in the case of a mouse. As another example, a device such as a power tool or other device that undergoes automatic changes to alleviate a repetitive motion disorder such as pressure sores or blisters may undergo changes that are sufficiently fast to reduce or eliminate pressure sores or blisters notwithstanding being at a rate that may be too fast in the aforementioned example of a computer mouse or computer keyboard.

FIG. 1 is a block diagram of an example operating environment 100 in which a device 102 may be used by a user 104, arranged in accordance with at least some embodiments described herein. The device 102 may facilitate prevention or alleviation of a repetitive motion disorder. The device 102 may be, for example, a hand- or foot-operated device, or a device that interacts with or supports a hand or a foot and/or perhaps some other portion(s) of the user's body. The device 102 may include, but is not limited to, a computer mouse, a computer keyboard, a computer monitor, a pen or other writing instrument, a manual or power tool, a hand rest, a computer mouse pad, a chair, a shoe, a home appliance, or other device that may be operated by the user. The user 104 may be any person or other user of the device 102 who may use the device 102, as indicated by an arrow 106.

The device 102 may include a physical interface 108 and a motor 110. The physical interface 108 may have a size, a shape, an orientation, and a position. In some embodiments, the user 104 may physically interact with the physical interface 108 during use of the device 102. For instance, the user 104 may hold or grasp the device 102 via the physical interface 108, stand or sit in or on the device 102 via the physical interface 108, or otherwise touch the physical interface 108 during use of the device 102. Alternately or additionally, the user 104 may be spatially separated from the physical interface 108 and may have some spatial relationship with the physical interface 108. In an example embodiment, the physical interface 108 may include one or more buttons, a scroll wheel, a housing, a handle, or other components of the device 102.

By way of example only, the physical interface 108 may include a housing of the device 102. The housing may include a rigid material, an elastic material, a soft pliable material, or the like or any combination thereof. Where the housing includes an elastic material and/or a soft pliable material, the motor 110 may operate one or more rigid elements within the housing to change the shape of the elastic material and/or the soft pliable material of the housing. Alternately or additionally, the housing may include multiple pieces of a rigid material where the pieces are hinged to each other and/or interconnected by other material such as elastic or soft pliable material. In these and other embodiments, the motor 110 may operate to cause individual control and/or movement of one or more of the pieces of the rigid material.

As another example, the physical interface 108 may include at least a display portion of a computer monitor. The motor 110 may change a vertical position, a horizontal position, a tilt angle, and/or other aspect of the display relative to the user 104.

The motor 110 may be operably coupled to the physical interface 108. The motor 110 may be configured to automatically change at least one of the size, the shape, the orientation, or the position of at least a portion of the physical interface 108 ergonomically and repeatedly during use of the device 102 to facilitate prevention or alleviation of a repetitive motion disorder. An effect of the automatic change of the at least one of the size, the shape, the orientation, or the position of the at least the portion of the physical interface 108 may be to change at least one of a posture, a gaze direction, a neck angle, a finger flex angle, a wrist angle, hand/palm orientation, or other positional change of a particular body part of the user 104, or a spatial relationship between the user 104 and the device 102.

The motor 110 may include an electrical motor and may be configured to be electrically coupled to an electrical power source that provides electrical power to operate the motor 110. For instance, the electrical power source may include mains electricity, a low voltage power source within or external to the device 102, and/or a battery within or external to the device 102, or the like or any combination thereof Alternately or additionally, the motor 110 may be configured to derive operating power from movement of the device 102 during use of the device 102. In these and other embodiments, the motor 110 may include various mechanical elements such as, but not limited to, a pendulum, a ratchet, a gear box, a cam, and/or a lever that cooperate to automatically change the physical interface 108 in response to movement of the device 102 during use thereof. In some embodiments, other power sources may be implemented, such as solar power.

The greater the frequency and/or the degree of automatic change to the at least one of the size, the shape, the orientation, or the position of the at least the portion of the physical interface 108, the more pronounced its effect may be on muscles and/or tendons of the user 104 that are affected by using the device 102. Accordingly, a particular rate and/or range of change for the automatic changes to the device 102 may be determined through experimentation, simulation, during actual use by a particular user 104, and/or other suitable process so as to arrive at a suitable rate/range for the user 104 and/or for a group of users. Alternately or additionally, the user 104 may set the rate and/or range of change for the automatic changes to the device 102 and/or may set other aspects of the automatic changes to the device 102 using configurable settings, some aspects of which are described below.

The device 102 may optionally further include one or more of a controller 112, a sensor 114, and a reset switch 116. Alternatively, the controller 112, the sensor 114, and/or the reset switch 116 may be omitted from the device 102.

In some embodiments, the controller 112 may be communicatively coupled to the motor 110, including in some embodiments in which the motor 110 includes the electrical motor and the physical interface 108 includes the housing. In these and other embodiments, the controller 112 may be configured to control the motor to temporally control automatic changes to the housing. Alternately or additionally, the controller 112 may be configured to control the motor 110 to temporally control automatic changes to the housing based on configurable settings. The configurable settings may be selected or configured by the user 104, for example. Alternately or additionally, the configurable settings may include one or more default settings. In view of the foregoing, the controller 112 may implement software control over the automatic changes to the physical interface 108 according to some embodiments.

The sensor 114 may be configured to detect which of multiple portions of the physical interface 108 is contacted during the use of the device 102. The sensor 114 may include, but is not limited, a capacitance touch sensor, a resistance touch sensor, a piezo touch sensor, an optical sensor, or other sensor(s) or any combination thereof. In these and other embodiments, the controller 112 may be configured to control the motor 110 to automatically change the at least one of the size, the shape, the orientation, or the position of one or more of the multiple portions of the physical interface 108 based on data generated by the sensor 114 indicating which of the multiple portions of the physical interface 108 is contacted during the use of the device 102.

For example, the controller 112 may control the motor 110 to change, with relatively greater frequency, portions of the physical interface 108 that are contacted during the use of the device 102 with relatively greater frequency.

The reset switch 116 may be operably coupled to one or both of the physical interface 108 and the motor 110. In these and other embodiments, the at least one of the size, the shape, the orientation, or the position of the at least the portion of the physical interface 108 may be configured to be returned to a default state in response to actuation of the reset switch 116. The default state may include an original size, shape, orientation, or position of the at least the portion of the physical interface 108, for example. The reset switch 116 may allow the user 104 to reset the device 102 to its default state at any time if, for instance, the user 104 objects to a current state of the device 102 that may be the result of a series of one or more automatic changes to the at least one of the size, the shape, the orientation, or the position of the at least the portion of the physical interface 108. The reset switch 116 may include a mechanical switch or other switch that may be configured to, for example, at least temporarily release the motor 110 from the physical interface 108. Alternately or additionally, the reset switch 116 may be implemented as a software command sent to the device 102 by an external system, and/or sent from the controller 112 to the motor 110 or other component of the device 102.

In some embodiments, the performance of the user 104 with the device 102 may be measured and used in a feedback loop. For example, if the device 102 is a computer keyboard or a computer mouse communicatively coupled to a computer, the computer may measure a typing speed, pointing accuracy, or other performance parameter of the device 102 over time when in use by the user 104. The performance parameter over time may be correlated, e.g., by the computer, to corresponding settings of the physical interface 108, where the settings may include size, shape, orientation, and/or position settings. Settings that correlate with relatively better values for the performance parameter may be favored over settings that correlate with relatively worse values for the performance parameter by, for example, maintaining settings that correlate with the relatively better values for longer durations than settings that correlate with the relatively worse values. Accordingly, the rate of changes to the at least the portion of the physical interface 108 may vary in some embodiments.

An overview of a variety of different specific embodiments of the device 102 and the user 104 will now be provided, followed by a more detailed description of a particular specific embodiment of the device 102 as a computer mouse. With one or more of the specific embodiments described below, the changes to the device 102 may be sufficiently slow and/or small in amount, so as to be generally unnoticeable to the user 104, yet may have a cumulative effect over time to facilitate prevention or alleviation of a repetitive motion disorder. In other implementations, the changes can be more noticeable to the user 104 (e.g., faster changes and/or a larger amount of changes), and such may also have a cumulative effect over time to facilitate prevention or alleviation of a repetitive motion disorder. The rate and/or amount of the changes may depend on the application and/or nature of the repetitive motion disorder to be prevented or alleviated. Alternately or additionally, the changes may be designed to train or otherwise suggest to the user 104 to adopt a different posture, gaze direction, neck angle, finger flex angle, or wrist angle, or to train the user 104 to effect some other physiological change when interacting with the device 102.

The device 102 may include a computer mouse. A height of an upper surface of the computer mouse may be configured to move slowly during use of the computer mouse over a total distance of about one inch, or more or less than one inch, for example. The change may be slow and/or small enough that it may not be noticed by the user 104. More generally, the rate and/or amount of change may be selected to produce a desired outcome of preventing or alleviating a repetitive motion disorder, whether or not the change is slow and/or small enough that it may not be noticed by the user 104. For instance, relatively slow changes of a first amount or relatively faster changes of a second amount less than the first amount may produce the same net change over a given duration of time. However, one of the combinations may be less noticeable to users. For example, slower and larger changes may be less noticeable, at least in frequency, than faster and smaller changes.

The change of the height of the upper surface of the computer mouse may cause an angle and posture of the hand, fingers, and/or wrist of the user 104 with respect to the computer mouse to change continuously or semi-continuously during the use of the computer mouse, which may facilitate prevention and/or alleviation of CTS and/or of other repetitive motion disorders. Alternatively or additionally to the upper surface of the mouse and as will be further described below, one or more side, bottom, front, or rear surfaces of the mouse may also undergo some sort of change in a dimensional/positional characteristic so as to facilitate prevention or alleviation of a repetitive motion disorder.

Alternately, the device 102 may include a computer mouse pad, which may be used with a static shaped mouse and/or the mouse described above that has one or more changing surfaces. A height of the computer mouse pad and/or an angle of an upper surface of the computer mouse pad may be automatically changed during use to facilitate prevention or alleviation of a repetitive motion disorder. Implementing the device 102 as the computer mouse pad is an example in which the user 104 may not directly physically touch the device 102 during use but the automatic changes to the device 102 implemented as the computer mouse pad may nevertheless have an effect of changing at least one of the posture, gaze direction, neck angle, finger flex angle, or wrist angle of the user 104, or a spatial relationship between the user 104 and the device 102, since a computer mouse that the user 104 directly physically touches may be supported by the device 102 implemented as the computer mouse pad.

Alternately, the device 102 may include a computer monitor. A height, lateral position, and/or viewing angle of the computer monitor with respect to the user 104 may be automatically changed during use to facilitate prevention or alleviation of a repetitive motion disorder. Implementing the device 102 as the computer monitor is another example in which the user 104 may not directly physically touch the device 102 during use but the automatic changes to the device 102 implemented as the computer monitor may nevertheless have an effect of changing at least one of the posture, gaze direction, neck angle, finger flex angle, or wrist angle of the user 104, or a spatial relationship between the user 104 and the device 102, since the user 104 may view the device 102 implemented as the computer monitor during use.

Alternately, the device 102 may include a pen, a pencil, or other writing instrument. A diameter or shape of a portion of the writing instrument held during use, and/or an angle between the portion of the writing instrument and a tip of the writing instrument may be automatically changed to facilitate prevention and/or alleviation of pressure sores on one or more of the fingers used by the user 104 to hold the writing instrument.

Alternatively, the device 102 may include a manual or power tool such as a handheld drill, a handheld saw, a handheld router, or the like. A circumference or shape or other aspect of a handle of the tool may be automatically changed to facilitate prevention and/or alleviation of a repetitive motion disorder in the user 104 by, e.g., spreading stresses and/or vibration-induced damage over a variable region of the hand or other part of the body of the user 104.

Alternately, the device 102 may include a shoe worn by the user 104. A shape of insole padding included in the shoe, a height of a heel of the shoe, or some other aspect of the shoe may be automatically changed during use to minimize formation of blisters or pressure sores.

Alternately, the device 102 may include a hand rest, such as a hand rest on a chair or a palm rest for use with a computer keyboard or a computer mouse, or the like. A height of the hand rest, a lateral position of the hand rest with respect to the user 104, and/or an angle of the hand rest may be automatically changed during use to facilitate prevention or alleviation of a repetitive motion disorder.

Alternately, the device 102 may include a chair. A height, seat angle, relative height of armrests, backrest angle, lumbar support, or other aspect of the chair may be automatically changed during use to facilitate prevention or alleviation of back pain, pressure sores, or the like.

Alternately, the device 102 may include a woman's bra or bathing suit that includes shoulder straps. The relative locations of the shoulder straps with respect to the rest of the bra or bathing suit may be automatically changed to facilitate the prevention or alleviation of pressures sores on the shoulders of the user 104 and optionally to further facilitate the prevention or elimination of shoulder strap tan lines on the user 104.

Alternately, the device 102 may include a keyboard. A height, angle, or position of all or a part of the keyboard may be automatically changed to facilitate the prevention or alleviation of a repetitive motion disorder such as CTS.

Alternately, the device 102 may include a home appliance or home device such as a vacuum cleaner, an iron, a brush for cleaning, or the like in which the user 104 holds a handle of the home appliance or home device in the hand of the user 104 for extended periods while applying significant force. A shape of the handle of the home appliance or home device may be automatically changed to facilitate the prevention or alleviation of a repetitive motion disorder.

Figure 2:
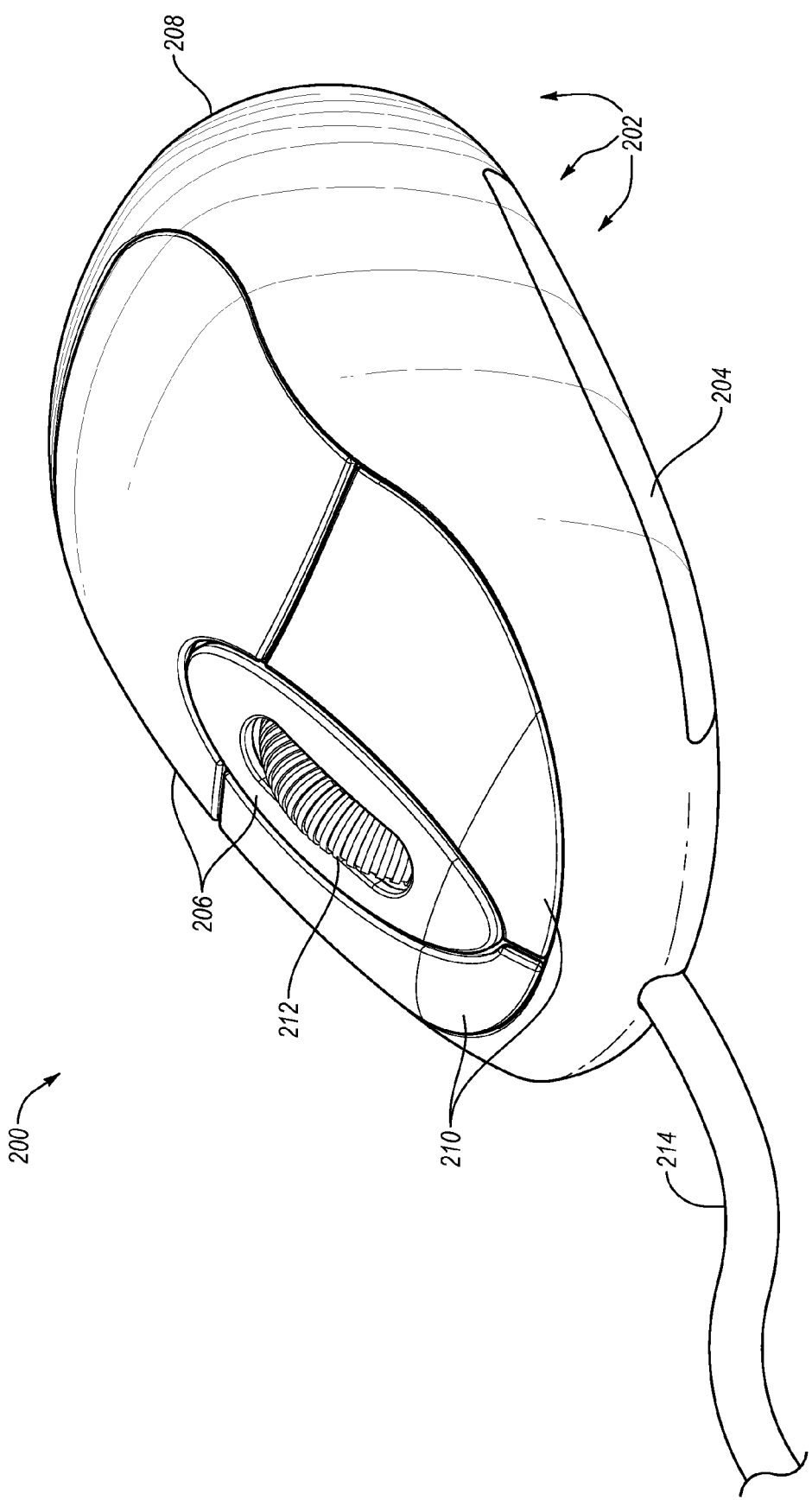
FIG. 2 is a perspective view of an example embodiment of a computer mouse.

FIG. 2 is a perspective view of an example embodiment of a computer mouse 200, arranged in accordance with at least some embodiments described herein. The computer mouse 200 may be an example of a specific embodiment of the device 102 of FIG. 1.

The computer mouse 200 may include a housing, generally denoted at 202. The housing 202 may be an example of a specific embodiment of the physical interface 108 of FIG. 1. The housing 202 may include a base 204, a top plate 206, and a sidewall 208 that couples the top plate 206 and the base 204 together. In some embodiments, the base 204 and the top plate 206 may include rigid material(s), while the sidewall 208 may include elastic material(s), soft pliable material(s), or both elastic and soft pliable material(s). It is to be understood that the configurations of the base 204, the top plate 206, and the sidewall 208 shown in FIG. 2 are provided by way of example only and that the base 204, the top plate 206, and the sidewall 208 may have any suitable configuration.

Although not illustrated in FIG. 2 (but shown in other figures), the computer mouse 200 may additionally include a motor operably coupled to and positioned within the housing 202. The motor may include an electrical motor or a motor that derives power from movement of the computer mouse 200, analogous to the motor 110 of FIG. 1 already described above. Accordingly, the motor of the computer mouse 200 may be configured to automatically change at least one of a size, a shape, an orientation, or a position of at least a portion of the housing 202 ergonomically and repeatedly during use of the computer mouse 200 to facilitate prevention or alleviation of a repetitive motion disorder.

For example, the motor of the computer mouse 200 may be configured to automatically change the at least one of the size, the shape, the orientation, or the position of the at least the portion of the housing 202 by automatic change of at least one of a height of the housing 202 between a first height and a second height during use of the computer mouse 200, a length of the housing 202 between a first length and a second length during use of the computer mouse 200, or a width of the housing 202 between a first width and a second width during use of the computer mouse 200. In these and other embodiments, using an elastic and/or soft pliable material for the sidewall 208 may allow the height, length, and/or width of the computer mouse 200 to be adjusted by the motor of the computer mouse 200. In some embodiments, the motor may implement positional/dimensional changes of one or more rigid portions of the housing 202, alternatively or additionally to changes to elastic and/or soft pliable material of the housing 202.

As another example, the at least the portion of the housing 202 may include the top plate 206. In these and other embodiments, the motor of the computer mouse 200 may be configured to automatically change the at least one of the size, the shape, the orientation, or the position of the at least the portion of the housing 202 by automatic change of an angle of the top plate 206 with respect to the base 204 between a first angle and a second angle during use of the computer mouse 200. Alternately or additionally, the angle of the top plate 206 with respect to the base 204 may change between the first angle and the second angle and back again in a cyclic manner during use of the computer mouse 200.

The computer mouse 200 may include an optical mouse including one or more optical emitters (not shown), such as one or more light-emitting diodes (LEDs) and an imaging array of optical sensors (not shown), such as photodiodes, to detect movement relative to the underlying surface of the computer mouse 200. In other embodiments, the computer mouse 200 may include a mechanical mouse, a laser mouse, an inertial or gyroscopic mouse, a 3-D mouse, a trackball mouse, or the like. The components used in such computer mice to detect movement are not illustrated or described in detail herein for simplicity.

Although not illustrated in FIG. 2 (but shown elsewhere), the computer mouse 200 may further include one or more of a controller, a sensor, and a reset switch, which may be analogous to, respectively, the controller 112, the sensor 114, and the reset switch 116 described above.

In the illustrated embodiment, the computer mouse 200 may further include buttons 210, a scroll wheel 212, and a cable 214.

The buttons 210 and the scroll wheel 212 may allow a user to perform various system-dependent operations. For instance, the buttons 210 may allow the user to select elements in a graphical user interface (GUI) by, e.g., a left click, and/or to open a list of menu items or options by, e.g., a right click. Alternately or additionally, the scroll wheel 212 may provide the computer mouse 200 with scroll functionality. The foregoing functions associated with the buttons 210 and the scroll wheel 212 are provided by way of example only. In other embodiments, the functions provided by the buttons 210 and the scroll wheel 212 may be different than those explicitly mentioned and/or may be configurable by the user. Alternately or additionally to automatically changing at least one of the size, the shape, the orientation, or the position of the at least the portion of the housing 202, the motor of the computer mouse 200 may be configured to automatically change at least one of a size, a shape, an orientation, or a position of one or more of the buttons 210 and/or of the scroll wheel 212 to further facilitate the prevention or alleviation of a repetitive motion disorder. Alternately or additionally, in this and other embodiments, the automatically changing the at least one of the size, the shape, the orientation, or the position of the at least the portion of the physical interface 108 may facilitate the prevention or alleviation of a frozen posture where stress is applied to the same point(s) for a prolonged period, or to facilitate the prevention or alleviation of other forms of physiological damage.

The cable 214 may provide a hardwired connection between the computer mouse 200 and a computer. The computer mouse 200 may receive operating power in the form of electrical power from the computer via the cable 214. Alternately or additionally, the computer mouse 200 may receive one or more commands from the computer via the cable 214, such as a reset and/or a speed setting. The motor of the computer mouse 200 may automatically change at least one of the size, the shape, the orientation, or the position of the at least the portion of the housing 202 using the electrical power received via the cable 214.

Alternately, the computer mouse 200 may include a wireless mouse such that the cable 214 may be omitted. In these and other embodiments, the motor of the computer mouse 200 may automatically change at least one of the size, the shape, the orientation, or the position of the at least the portion of the housing 202 using electrical power received from a battery positioned within the housing 202 of the computer mouse 200.

In still other embodiments, the motor of the computer mouse 200 may receive operating power by deriving operating power from movement of the computer mouse 200 during use of the computer mouse 200. For example, the operating power can be derived from accelerations of the computer mouse 200 in a horizontal plane as the user slides the computer mouse 200 in different directions, or from the user pushing the buttons 210, or from the user rotating the scroll wheel 212, or the like or any combination thereof.

Figure 3:
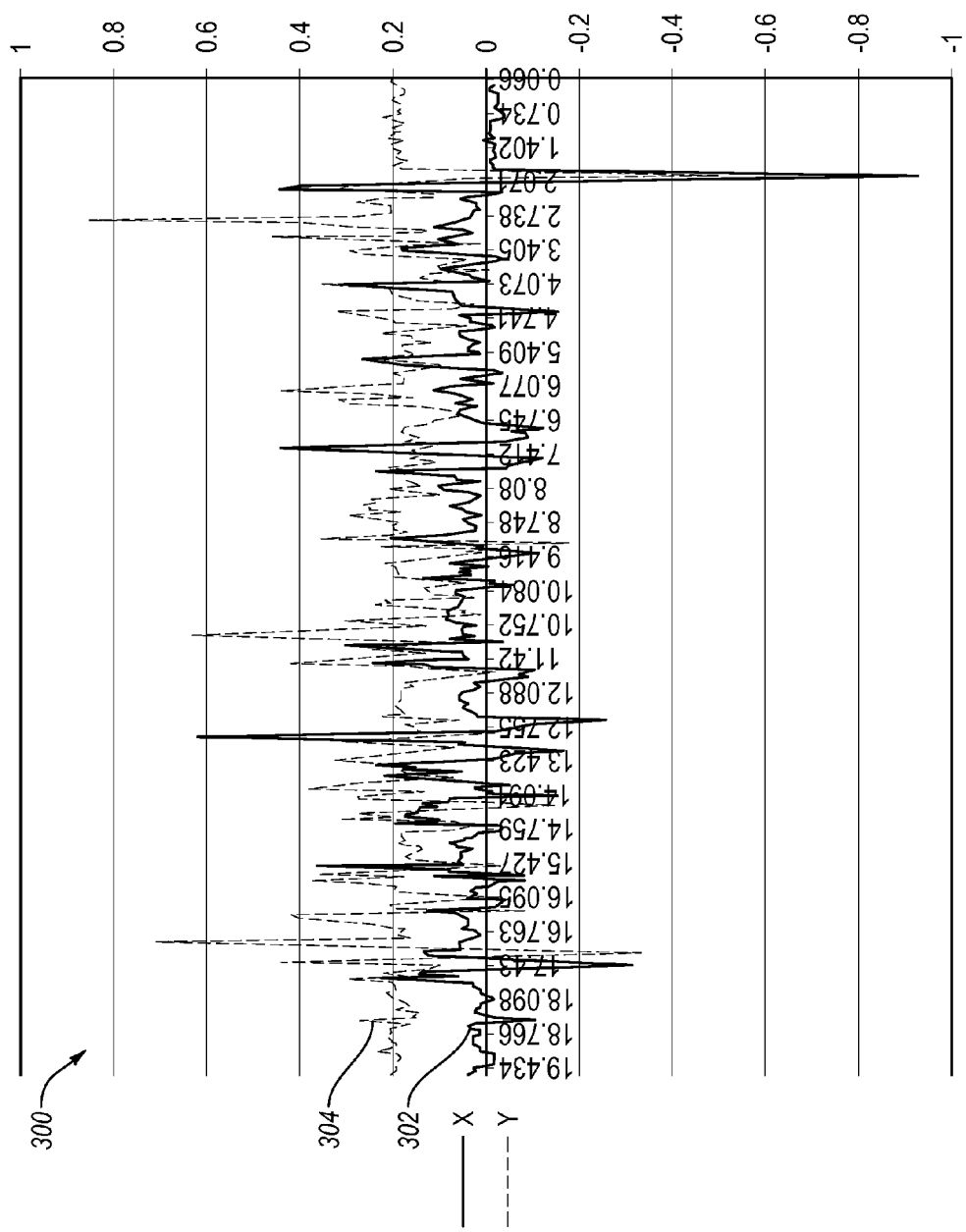
FIG. 3 is a graph of example acceleration that may be characteristic of a computer mouse as a function of time.

In this regard, FIG. 3 is a graph 300 of example acceleration that may be characteristic of a computer mouse as a function of time, arranged in accordance with at least some embodiments described herein. The vertical axis in the graph 300 represents acceleration in units of meters per second squared (m/sec$^2$) and the horizontal axis in the graph 300 represents time in units of seconds, where time is increasing to the left.

The graph 300 of FIG. 3 includes a first curve 302 and a second curve 304 corresponding to orthogonal X and Y directions defining a plane of movement in which the computer mouse may be moved. The first curve 302 corresponds to acceleration in the X direction and the second curve 304 corresponds to acceleration in the Y direction. The second curve 304 includes a 0.2 m/sec$^2$ bias that can be ignored.

As illustrated in FIG. 3, peak accelerations of 0.2 m/sec$^2$ or more may appear regularly in each of the first and second curves 302 and 304 over the course of about a 20-second period of time. Peak accelerations of 0.1 m/sec$^2$ or more may appear even more regularly and even peak accelerations of 0.4 m/sec$^2$ or more may appear with some regularity. Peak accelerations of 0.1, 0.2, or 0.4 m/sec$^2$ or more may be sufficient, according to some embodiments, to derive operating power to operate a motor within a computer mouse that may be configured to automatically change at least one of a size, a shape, an orientation, or a position of at least a portion of a housing or other physical interface of the computer mouse. An example embodiment in which peak accelerations of 0.1, 0.2, or 0.4 m/sec$^2$ or more may be sufficient to derive operating power for such a motor will now be described with reference to FIGS. 4A-4B.

Figure 4A:
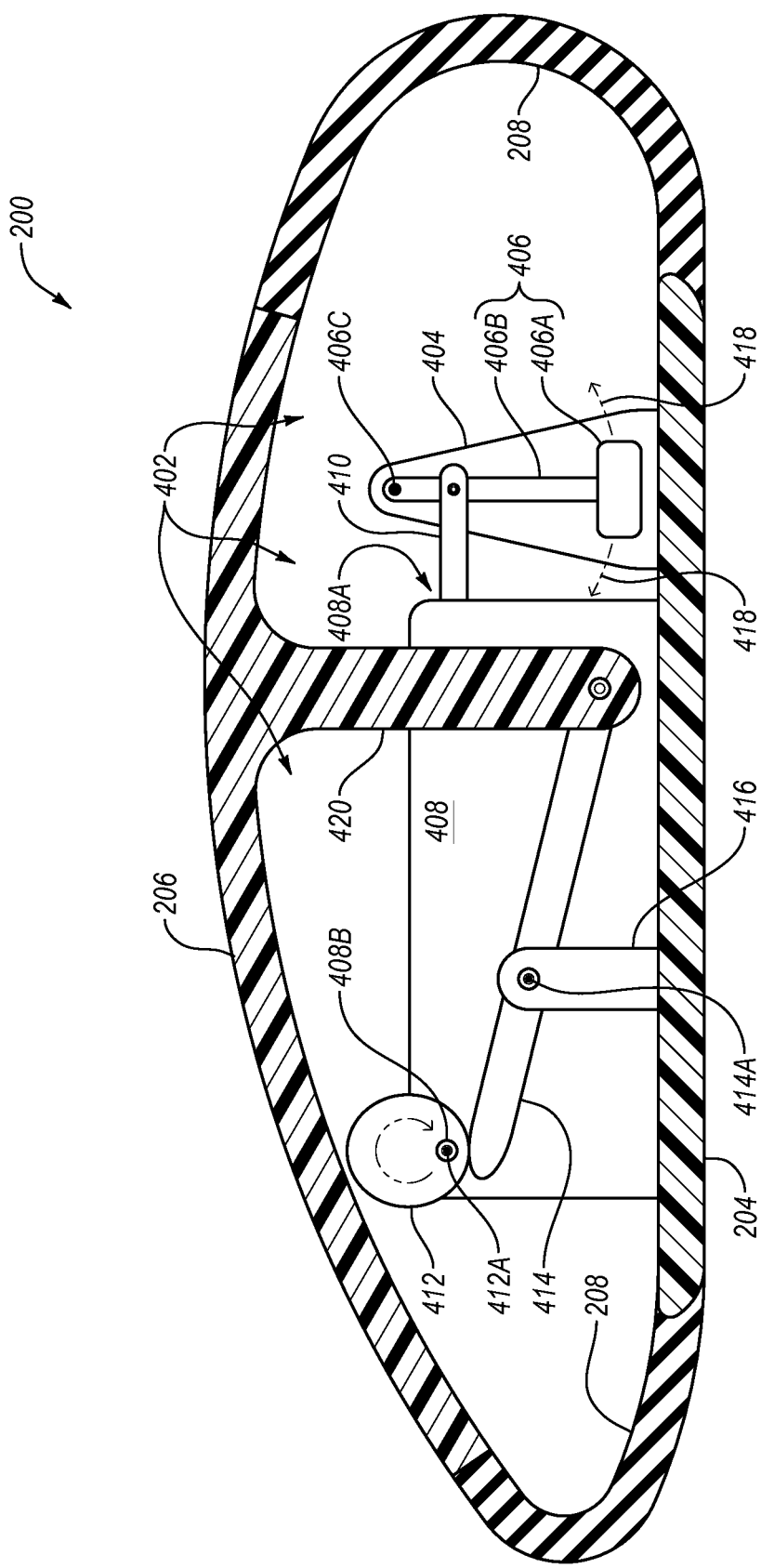
FIGS. 4A-4B include cross-sectional views of an example embodiment of the computer mouse of FIG. 2.
Figure 4B:
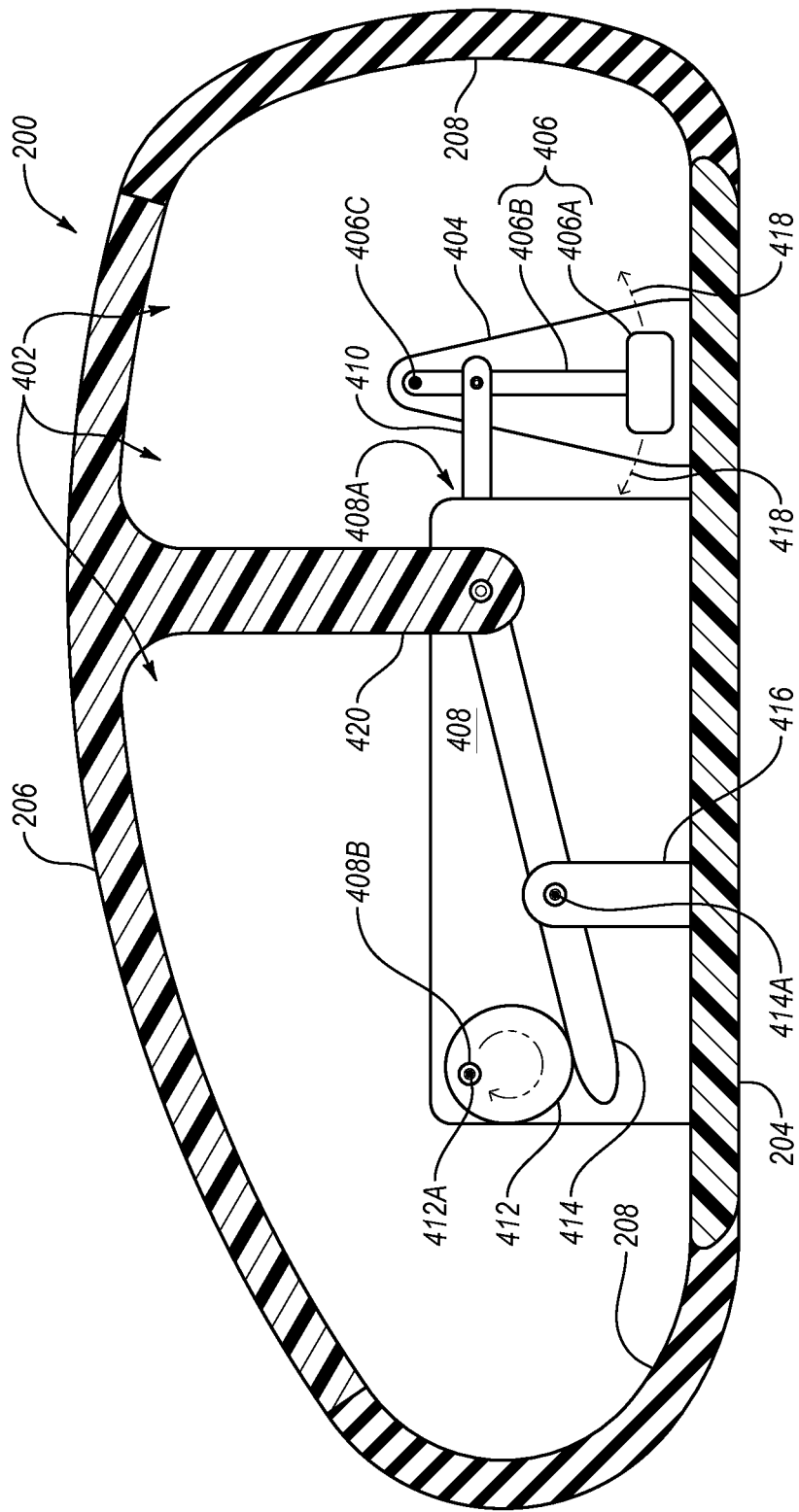

FIGS. 4A-4B include cross-sectional views of an example embodiment of the computer mouse 200 of FIG. 2, arranged in accordance with at least some embodiments described herein. The computer mouse 200 illustrated in FIGS. 4A-4B includes the base 204, the top plate 206, and the sidewall 208, which collectively form the housing 202 (FIG. 2) of the computer mouse 200.

In the embodiment of FIGS. 4A-4B, the computer mouse 200 may include a motor 402 configured to derive operating power from movement of the computer mouse 200. Various other components of the computer mouse 200, such as buttons, a scroll wheel, components associated with detecting movement of the computer mouse 200, a printed circuit board, and the like have been omitted for clarity. The position and exact configuration of the motor 402 and the various other components of the computer mouse 200 of FIGS. 4A-4B may be arranged to accommodate each other. Accordingly, FIGS. 4A-4B illustrate but one embodiment of a computer mouse including a motor and other embodiments are possible.

The motor 402 may include a first support 404, a pendulum 406, a gear assembly 408, a linkage 410, a cam 412, a lever 414, and a second support 416.

The first support 404 may be coupled to the base 204. A position of the first support 404 may be fixed relative to the base 204.

The pendulum 406 may be rotatably coupled to the first support 404. The pendulum 406 may include a weight 406A and a rigid elongate member 406B.

The weight 406A may be coupled to a first end of the rigid elongate member 406B. The weight 406A may have an example mass of about 10 grams (g) in some embodiments.

A second end of the rigid elongate member 406B opposite its first end may be rotatably coupled to the first support 404 at an axis of rotation 406C of the pendulum 406. Accordingly, the weight 406A of the pendulum 406 may be configured to generally swing side to side about the axis of rotation 406C, as indicated by a swing path generally designated at 418, in response to movement including acceleration of the computer mouse 200. In some embodiments, the rigid elongate member 406B may have a length of about ten millimeters (mm).

The gear assembly 408 may include an input, generally designated at 408A, and an output 408B. As described in more detail with respect to FIG. 5, the input 408A of the gear assembly 408 may include a ratchet gear with inclined teeth provided around a circumference of the ratchet gear. Alternately or additionally, the output 408B of the gear assembly 408 may include a gear axle to which the cam 412 may be coupled.

In some embodiments, the gear assembly 408 may include a gearbox. In these and other embodiments, an overall reduction ratio of the gear assembly 408 may be about 1000:1. More generally, an overall reduction ratio of the gear assembly 408 may be X:1, where X is greater than or equal to 500 and less than or equal to 2000. Alternately or additionally, X may be in a range from about 750 to about 1750, or in a range from about 1000 to about 1500. In other embodiments, X may be less than 500 or greater than 2000. Accordingly, based on inputs involving peak accelerations of 0.1, 0.2, or 0.4 m/sec$^2$ or more as discussed with respect to FIG. 3 that may be sufficient to cause the weight 406A to swing along the swing path 418, the output 408B of the gear assembly 408 may output sufficient force to automatically change at least one of the size, the shape, the orientation, or the position of the at least the portion of the housing 202 (FIG. 2) or other physical interface of the computer mouse 200 even with a hand of a user resting on the computer mouse 200.

The linkage 410 may couple the pendulum 406 to the input 408A of the gear assembly 408. A first end of the linkage 410 may be coupled to the rigid elongate member 406B of the pendulum 406 between the first end and the second end of the rigid elongate member 406B. For example, the first end of the linkage 410 may be coupled to the rigid elongate member 406B of the pendulum 406 at a point on the rigid elongate member 406B about two mm, for example, from the axis of rotation 406C of the pendulum 406, or at some other location. More generally, the first end of the linkage 410 may be coupled to the rigid elongate member 406B of the pendulum 406 at a point on the rigid elongate member 406B that is a distance D from the axis of rotation 406C of the pendulum 406 and where the rigid elongate member 406B has a length L and where a ratio D/L is in a range from about 0.05-0.2, or in a range from about 0.1-0.15. As described in more detail with respect to FIG. 5, a second end of the linkage 410 opposite its first end may include a pawl that selectively engages inclined teeth of a ratchet gear included in the input 408A of the gear assembly 408.

The cam 412 may be coupled to the output 408B of the gear assembly 408. In the illustrated embodiment of FIGS. 4A-4B, the cam 412 may include a circular member coupled to the output 408B at an axis of rotation 412A that is offset from a center of the cam 412. Alternately, the cam 412 may have a non-circular shape.

The lever 414 may have a first end in sliding contact with the cam 412 and a second end opposite the first end. The second end of the lever 414 may be coupled to the top plate 206. For example, a third support 420 extending downward from the top plate 206 may couple the second end of the lever 414 to the top plate 206. The third support 420 may be integrally formed with the top plate 206 or may be provided as a discrete component.

The second support 416 may be coupled to the base 204. A position of the second support 416 may be fixed relative to the base 204. The second support 416 may be coupled to the lever 414 at an axis of rotation 414A of the lever 414. The axis of rotation 414A of the lever 414 may be positioned between the first end and the second end of the lever 414.

Figure 5:
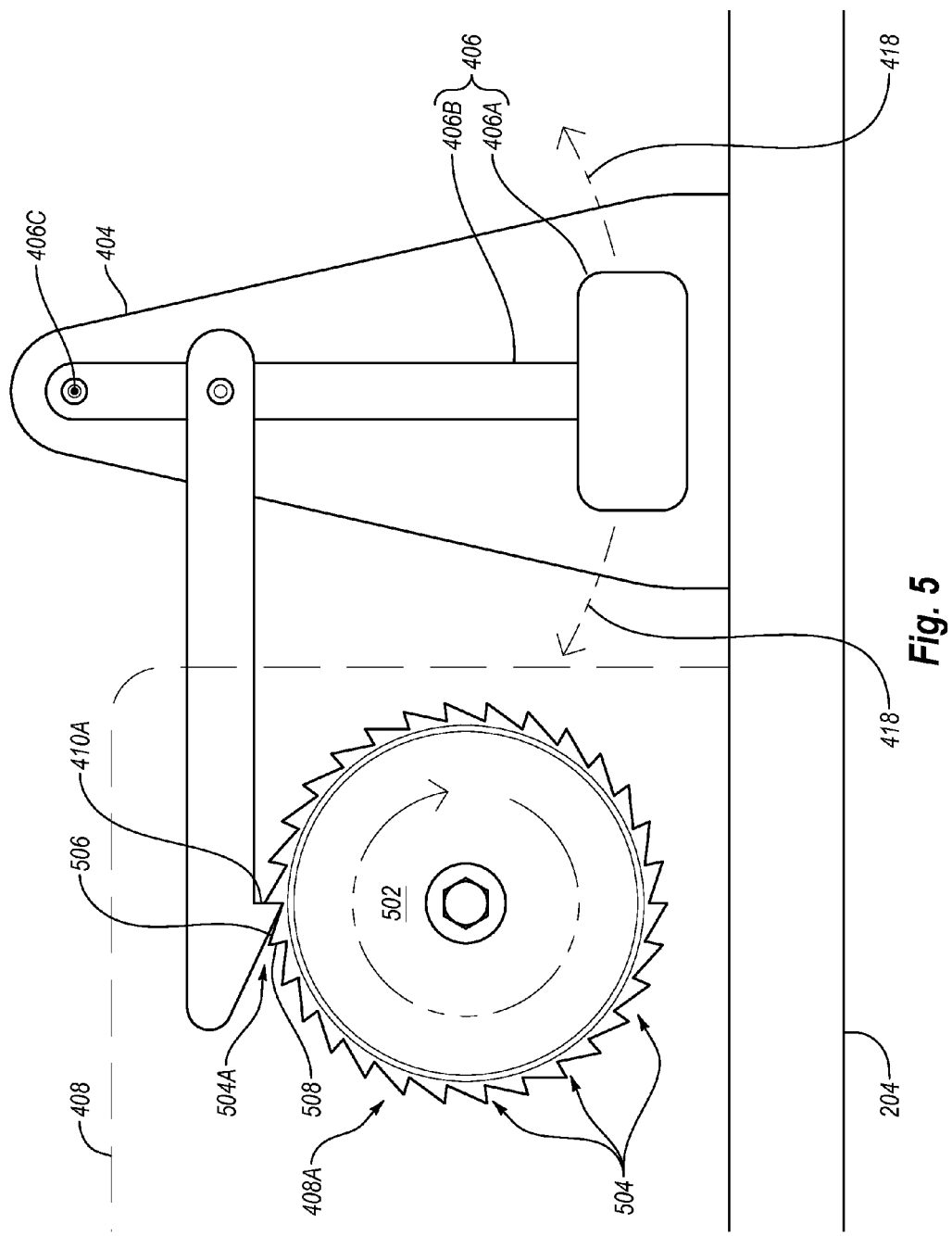
FIG. 5 illustrates an example embodiment of an input of a gear assembly of FIGS. 4A-4B.

FIG. 5 illustrates an example embodiment of the input 408A of the gear assembly 408 of FIGS. 4A-4B, arranged in accordance with at least one embodiment described herein. As illustrated, the input 408A of the gear assembly 408 may include a ratchet gear 502 with inclined teeth 504 provided around a circumference of the ratchet gear 502. The ratchet gear 502 may be configured to rotate in a single direction, such as clockwise in the illustrated embodiment.

As further illustrated in FIG. 5, the second end of the linkage 410 may include a pawl 410A that selectively engages the inclined teeth 504 of the ratchet gear 502.

In an absence of movement of the weight 406A of the pendulum 406, the pawl 410A of the linkage 410 may rest on a leading surface 506 of an inclined tooth 504A included in the inclined teeth 504 of the ratchet gear 502. In operation, when the weight 406A swings to the left, the linkage 410 may be translated to the left such that the pawl 410A of the linkage 410 may slide up and over the leading surface 506 of the inclined tooth 504A to engage a trailing surface 508 of the inclined tooth 504A. When the weight 406A swings back to the right, the linkage 410 may be translated to the right and the engagement of the trailing surface 508 of the inclined tooth 504A by the pawl 410A of the linkage 410 may cause the ratchet gear 502 to rotate clockwise. A gear wheel (not shown) on a common gear axle with the ratchet gear 502 may transfer rotary motion of the ratchet gear 502 to a next gear wheel in the gear assembly 408, and finally to the output 408B (FIGS. 4A-4B) of the gear assembly 408.

Returning to FIGS. 4A-4B, the lever 414 may be configured to rotate about the axis of rotation 414A of the lever 414 as the cam 412 rotates. For example, when the cam 412 is in the position illustrated in FIG. 4A, the first end of the lever 414 may rotate to a position relatively farther from the base 204 than when the cam 412 is in the position illustrated in FIG. 4B. Because the lever 414 may be rotatably coupled to the second support 416 at the axis of rotation 414A of the lever 414, rotation of the first end of the lever 414 away from the base 204 may cause the second end of the lever 414 to rotate toward the base 204, while rotation of the first end of the lever 414 toward the base 204 may cause the second end of the lever 414 to rotate away from the base 204.

The lever 414 may rotate about the axis of rotation 414A through a relatively small range of angles such that the rotation of the second end of the lever 414 is generally up and down in nature. The general up-and-down motion of the second end of the lever 414 as a result of rotation of the lever 414 about the axis of rotation 414A may raise and lower the third support 420, thereby raising and lowering the top plate 206. In this regard, FIG. 4A illustrates the computer mouse 200 with the top plate 206 at a relatively low height with respect to the base 204, while FIG. 4B illustrates the computer mouse 200 with the top plate 206 at a relatively greater height with respect to the base 204.

As previously described, the base 204 and the top plate 206 may include a rigid material, while the sidewall 208 may include an elastic and/or soft pliable material. Accordingly, the sidewall 208 may flex and/or stretch as the top plate 206 is raised and lowered by the motor 402 relative to the base 204. From a comparison of FIGS. 4A-4B, it can be seen that changes undergone by the sidewall 208 as the motor 402 raises and lowers the top plate 206 may cause changes in the height, the width, and/or the length of the computer mouse 200 of FIGS. 4A-4B. In other embodiments, the motor 402 (including its component parts) and/or the other parts coupled thereto may be coupled to other rigid or non-rigid portions of the housing 202 (such as to side/front/rear/bottom housing portions), so as to enable other additional or alternative positional/dimensional changes of the rigid or non-rigid portions of the housing 202 over time, for purposes of preventing or alleviating a repetitive motion disorder.

The motor 402 has been described in the context of the computer mouse 200. Alternately or additionally, the motor 402 or variations thereof may be implemented in other devices, such as the device 102 of FIG. 1.

Figure 6:
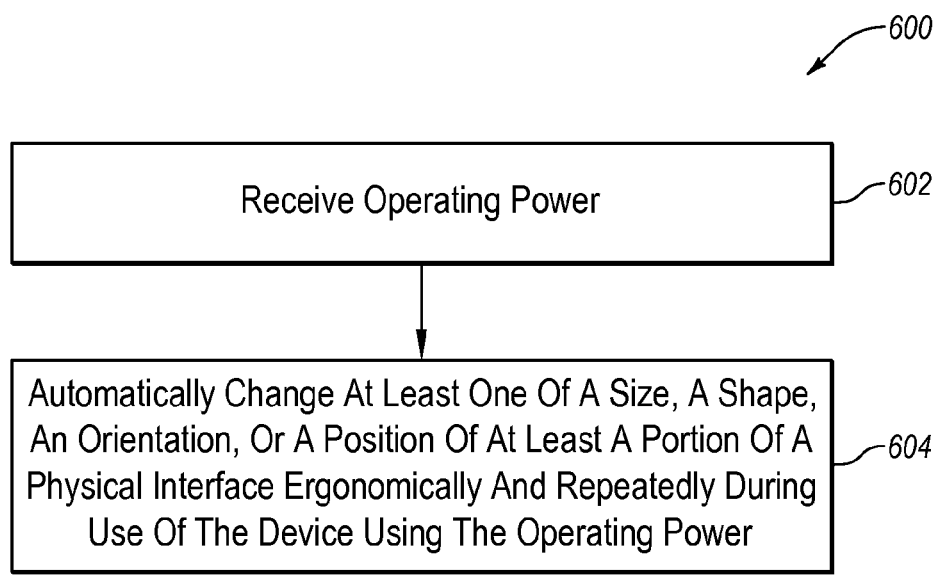
FIG. 6 shows a flow diagram of an example method to facilitate prevention or alleviation of a repetitive motion disorder associated with using a device having a physical interface.

FIG. 6 shows a flow diagram of an example method 600 to facilitate prevention or alleviation of a repetitive motion disorder associated with using a device having a physical interface, arranged in accordance with at least some embodiments described herein. The method 600 may be performed in whole or in part by, e.g., the device 102 of FIG. 1 or the computer mouse 200 of FIGS. 2 and 4A-4B. The method 600 includes various operations, functions, or actions as illustrated by one or more of blocks 602 and/or 604. The method 600 may begin at block 602.

In block 602 ("Receive Operating Power"), the device may receive operating power. Receiving operating power may include receiving electrical power from an electrical power source. Alternately, receiving operating power may include deriving operating power to operate a motor of the device from movement of the device during use of the device.

An example of how operating power may be derived from movement of the device to operate the motor will be described with reference to FIGS. 4A-5. While FIGS. 4A-5 illustrate the motor 402 and components thereof that may be implemented in the computer mouse 200, the motor 402 or variations thereof may alternately be implemented in other types of devices such that the following description of how operating power may be derived from movement of the device to operate the motor is not limited in its applicability to the computer mouse 200.

In view of the foregoing, deriving operating power to operate the motor of the device may include swinging the pendulum 406 of the motor 402 in response to lateral acceleration of the device by a user of the device, converting swinging of the pendulum 406 to rotation of the lever 414, and converting rotation of the lever 414 to displacement of a first portion of the physical interface (e.g., the top plate 206 of the housing 202) with respect to a second portion of the physical interface (e.g., of the base 204 of the housing 202).

Converting swinging of the pendulum 406 to rotation of the lever 414 may include displacing the linkage 410 coupled between the pendulum 406 and the input 408A of the gear assembly 408 in response to swinging of the pendulum 406, and rotating the cam 412 coupled to the output 408B of the gear assembly 408, where the cam 412 may be in sliding contact with the lever 414.

In these and other embodiments, the lever 414 may have its first end in sliding contact with the cam 412 and its second end coupled to the first portion of the physical interface, or to the top plate 206 through the third support 420 in the example of FIGS. 4A-4B. The device may further include the second support 416 coupled to the lever 414 at the axis of rotation 414A of the lever 414. The second support 416 may be coupled to the second portion of the physical interface, or to the base 204 in the example of FIGS. 4A-4B. The axis of rotation 414A of the lever 414 may be positioned between the first end and the second end of the lever 414. Accordingly, converting rotation of the lever 414 to displacement of the first portion of the physical interface with respect to the second portion of the physical interface may include at least one of: rotating the second end of the lever 414 away from the second portion of the physical interface in response to the first end of the lever 414 rotating toward the second portion of the physical interface such that a distance between the first portion and the second portion of the physical interface increases; or rotating the second end of the lever 414 toward the second portion of the physical interface in response to the first end of the lever 414 rotating away from the second portion of the physical interface such that the distance between the first portion and the second portion of the physical interface decreases.

Where the device includes the computer mouse 200 of FIGS. 4A-4B, converting rotation of the lever 414 to displacement of the first portion of the physical interface with respect to the second portion of the physical interface may more particularly include converting rotation of the lever 414 to displacement of the first portion of the housing 202 with respect to the second portion of the housing 202, including at least one of: rotating the second end of the lever 414 away from the base 204 in response to the first end of the lever 414 rotating toward the base 204 such that a distance between the top plate 206 and the base 204 increases; or rotating the second end of the lever 414 toward the base 204 in response to the first end of the lever 414 rotating away from the base 204 such that the distance between the top plate 206 and the base 204 decreases.

Returning to FIG. 6, in block 604 ("Automatically Change At Least One Of A Size, A Shape, An Orientation, Or A Position Of At Least A Portion Of A Physical Interface Ergonomically And Repeatedly During Use Of The Device Using The Operating Power"), at least one of a size, a shape, an orientation, or a position of at least a portion of the physical interface may be automatically changed ergonomically and repeatedly during use of the device using the operating power. Where the device includes the computer mouse 200, automatically changing the at least one of the size, the shape, the orientation, or the position of the at least the portion of the physical interface ergonomically and repeatedly during use of the device may include automatically changing at least one of a size, a shape, an orientation, or a position of at least a portion of a housing of the computer mouse ergonomically and repeatedly during use of the computer mouse.

In these and other embodiments, the device may further include a motor configured to effect automatic changes to the at least the portion of the physical interface.

One skilled in the art will appreciate that, for this and other processes and methods disclosed herein, the functions performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed embodiments.

For example, the method 600 may further include detecting which of multiple portions of the physical interface is contacted during the use of the device, such as via use of the sensor 114 of FIG. 1. The method 600 may further include automatically changing the at least one of the size, the shape, the orientation, or the position of one or more of the portions of the physical interface based on which of the portions of the physical interface is contacted during the use of the device. For example, with reference to FIG. 1, the sensor 114 may detect contact points and the controller 112 and/or a processor of a device such as a computer to which the device 102 is communicatively coupled may trigger or dictate specific changes over time to at least one of the size, the shape, the orientation, or the position of the one or more of the contact points in response to the contact points and/or according to a software program.

Alternately or additionally, the method 600 may further include measuring the performance of the user with the device. Measuring the performance of the user may include measuring a performance parameter of the device over time during the use of the device. The method 600 may also include correlating the performance parameter over time with corresponding settings of the device. The method 600 may also include favoring settings that correlate with relatively better values for the performance parameter over settings that correlate with relatively worse values for the performance parameter. Favoring settings that correlate with the relatively better values over settings that correlate with the relatively worse values may include maintaining settings that correlate with the relatively better values for longer durations than settings that correlate with the relatively worse values.

Figure 7:
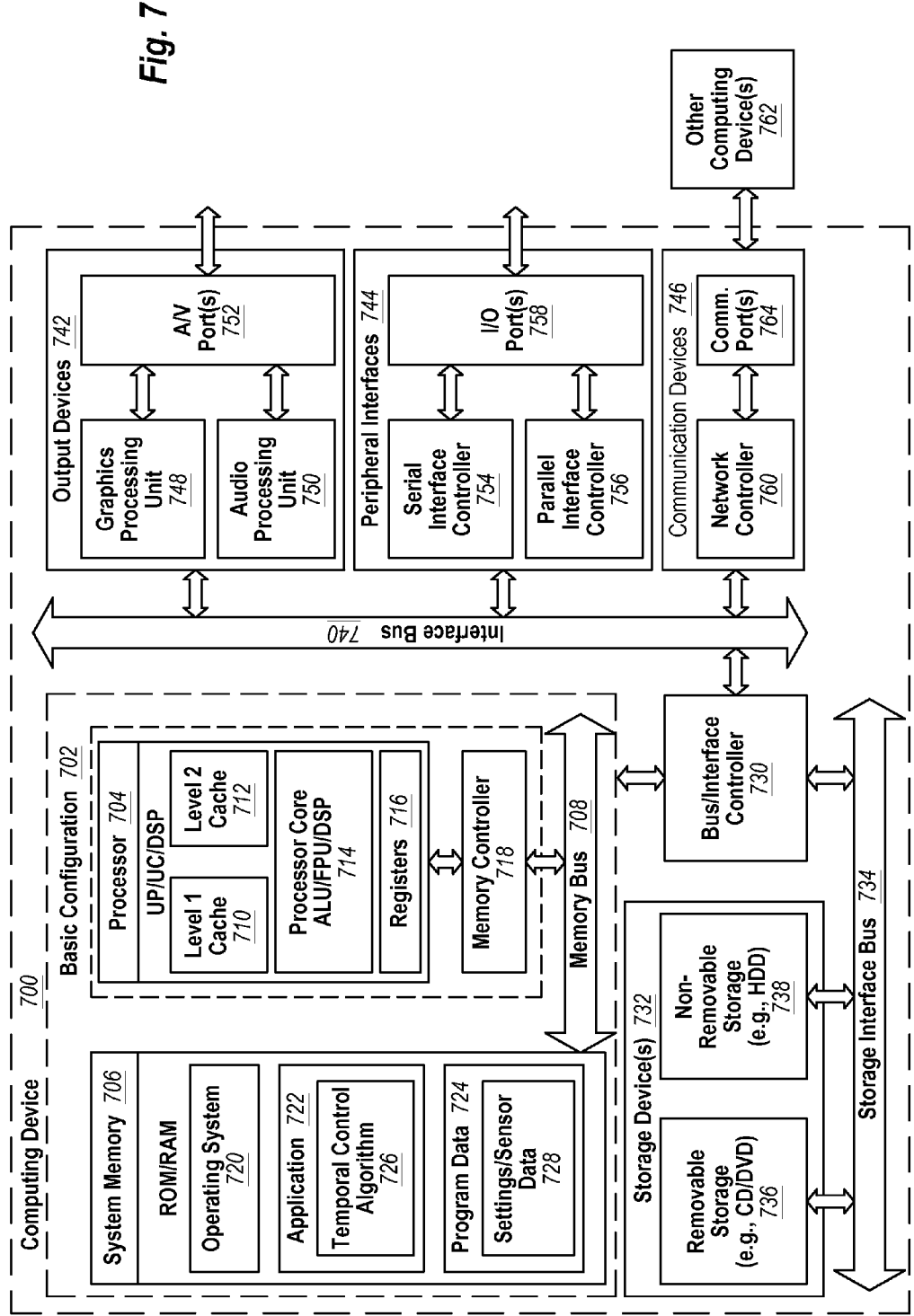
FIG. 7 is a block diagram illustrating an example computing device that is arranged for controlling a motor to temporally control automatic changes to a physical interface of a device, all arranged in accordance with at least some embodiments described herein.

FIG. 7 is a block diagram illustrating an example computing device 700 that is arranged for controlling a motor to temporally control automatic changes to a physical interface of a device, arranged in accordance with at least some embodiments described herein. By way of example only, the physical interface may include the physical interface 108 of the device 102 of FIG. 1 and/or the housing 202 of the computer mouse 200 of FIG. 2. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with processor 704, or in some implementations, memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a temporal control algorithm 726 that is arranged to temporally control automatic changes to a physical interface of a device. Program data 724 may include configurable settings and/or sensor data ("Settings/Sensor Data" in FIG. 7) 728 that may be useful for temporally controlling automatic changes to a physical interface of a device as is described herein. In some embodiments, application 722 may be arranged to operate with program data 724 on operating system 720 such that a motor may be controlled to temporally control automatic changes to the physical interface based on the configurable settings and/or sensor data indicating contact points between a user and the physical interface. The processor 704 and/or the system memory 706 may be provided on the device with the physical interface or on a remote device to which the device with the physical interface is communicatively coupled. Alternately or additionally, the processor 704 may correspond to the controller 112 of FIG. 1.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.), sensors such as the sensor 114 of FIG. 1, or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations, or as a device with a physical interface configured to be changed temporally to facilitate prevention or alleviation of a repetitive motion disorder as described herein.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A system, comprising:
   a device to facilitate prevention or alleviation of a repetitive motion disorder, the device comprising:
      a physical interface that includes a size, a shape, an orientation, and a position; and
      a motor operably coupled to the physical interface, wherein the motor is configured to automatically change at least one of the size, the shape, the orientation, or the position of at least a portion of the physical interface ergonomically and repeatedly during use of the device to facilitate prevention or alleviation of the repetitive motion disorder; and
   a computer communicatively coupled to the device and configured to perform or control performance of operations comprising:
      determine a performance parameter of the device over time during the use of the device;
      correlate the performance parameter over time with corresponding settings of the device, wherein the settings include at least one of a size setting, a shape setting, an orientation setting, or a position setting; and
      favor settings that correlate with relatively better values for the performance parameter over settings that correlate with relatively worse values for the performance parameter.

2. The system of claim 1, wherein an effect of the automatic change of the at least one of the size, the shape, the orientation, or the position of the at least the portion of the physical interface is to change at least one of a posture, a gaze direction, a neck angle, a finger flex angle, or a wrist angle of a user, or a spatial relationship between the device and the user.

3. The system of claim 1, wherein the device is a computer mouse, a computer keyboard, a computer monitor, a pen, or a manual or power tool.

4. The system of claim 1, wherein the physical interface comprises a housing of the device, and wherein the housing comprises an elastic material, a soft pliable material, both an elastic and a soft pliable material, or multiple pieces of a rigid material hinged to each other.

5. The system of claim 1, further comprising:
   a sensor configured to detect which of a plurality of portions of the physical interface is contacted during the use of the device, wherein the plurality of portions include the at least the portion of the physical interface; and
   a controller communicatively coupled to the motor and configured to control the motor to automatically change the at least one of the size, the shape, the orientation, or the position of one or more of the plurality of portions of the physical interface based on data generated by the sensor, indicating which of the plurality of portions of the physical interface is contacted during the use of the device.

6. The system of claim 1, further comprising a reset switch operably coupled to one or both of the physical interface and the motor, wherein the at least one of the size, the shape, the orientation, or the position of the at least the portion of the physical interface is configured to be returned to a default state in response to actuation of the reset switch.

7. A method to facilitate prevention or alleviation of a repetitive motion disorder associated with using a device having a physical interface, the method comprising:
   receiving operating power;
   detecting which of a plurality of portions of the physical interface is contacted during use of the device;
   automatically changing at least one of a size, a shape, an orientation, or a position of at least a portion of the physical interface ergonomically and repeatedly, during the use of the device, using the operating power and based on which of the plurality of portions of the physical interface is contacted during the use of the device;
   measuring a performance parameter of the device over time during the use of the device;
   correlating the performance parameter over time with corresponding settings of the device, wherein the settings include at least one of a size setting, a shape setting, an orientation setting, or a position setting; and
   favoring settings that correlate with relatively better values for the performance parameter over settings that correlate with relatively worse values for the performance parameter.

8. The method of claim 7, wherein the device further includes a motor configured to effect automatic changes to the at least the portion of the physical interface, and wherein receiving the operating power includes deriving the operating power to operate the motor from movement of the device during the use of the device.

9. The method of claim 8, wherein deriving the operating power to operate the motor comprises:
   swinging a pendulum of the motor in response to a lateral acceleration of the device;
   converting the swinging of the pendulum to a rotation of a lever; and
   converting the rotation of the lever to a displacement of a first portion of the physical interface with respect to a second portion of the physical interface.

10. The method of claim 9, wherein converting the swinging of the pendulum to the rotation of the lever comprises:
    displacing a linkage coupled between the pendulum and an input of a gear assembly in response to the swinging of the pendulum; and
    rotating a cam coupled to an output of the gear assembly, the cam being in sliding contact with the lever.

11. The method of claim 10, wherein:
    the lever has a first end in sliding contact with the cam and a second end coupled to the first portion of the physical interface,
    the device further includes a support coupled to the lever at an axis of rotation of the lever,
    the support is coupled to the second portion of the physical interface,
    the axis of rotation of the lever is positioned between the first end and the second end of the lever, and
    converting the rotation of the lever to the displacement of the first portion of the physical interface with respect to the second portion of the physical interface comprises at least one of:
       rotating the second end of the lever away from the second portion of the physical interface in response to the first end of the lever rotating toward the second portion of the physical interface such that a distance between the first portion and the second portion of the physical interface increases, or
       rotating the second end of the lever toward the second portion of the physical interface in response to the first end of the lever rotating away from the second portion of the physical interface such that the distance between the first portion and the second portion of the physical interface decreases.

12. The method of claim 7, wherein favoring the settings that correlate with the relatively better values for the performance parameter over the settings that correlate with the relatively worse values for the performance parameter includes maintaining the settings that correlate with the relatively better values for the performance parameter for longer durations than the settings that correlate with the relatively worse values for the performance parameter.

13. The method of claim 7, wherein the device comprises a computer mouse or a computer keyboard, and wherein the performance parameter comprises a pointing accuracy of the computer mouse or a typing speed of the computer keyboard.

14. A computer mouse, comprising:
    a housing that includes a base and a rigid top plate; and
    a motor operably coupled to and positioned within the housing,
    wherein the motor is configured to automatically change at least one of a size, a shape, an orientation, or a position of at least a portion of the housing ergonomically and repeatedly during use of the computer mouse to facilitate prevention or alleviation of a repetitive motion disorder, and
    wherein the motor comprises:
       a first support;
       a pendulum rotatably coupled to the first support;
       a gear assembly that has an input and an output;
       a linkage that couples the pendulum to the input of the gear assembly;
       a cam coupled to the output of the gear assembly;
       a lever that has a first end in sliding contact with the cam and a second end opposite the first end, wherein the second end of the lever is coupled to the rigid top plate; and
       a second support coupled to the lever at an axis of rotation of the lever, wherein the axis of rotation is positioned between the first end and the second end of the lever.

15. The computer mouse of claim 14, wherein the housing further comprises an elastic sidewall that couples the rigid top plate and the base together.

16. The computer mouse of claim 14, wherein the at least the portion of the housing comprises the rigid top plate, and wherein the motor is configured to automatically change the at least one of the size, the shape, the orientation, or the position of the at least the portion of the housing by automatic change of an angle of the rigid top plate with respect to the base between a first angle and a second angle during the use of the computer mouse.

17. The computer mouse of claim 14, wherein:
    the pendulum includes a weight and a rigid elongate member,
    the weight is coupled to a first end of the rigid elongate member,
    a second end of the rigid elongate member opposite the first end of the rigid elongate member is rotatably coupled to the first support,
    a first end of the linkage is coupled to the rigid elongate member between the first end and the second end of the rigid elongate member,
    the input of the gear assembly includes a ratchet gear with inclined teeth provided around a circumference of the ratchet gear, and
    a second end of the linkage opposite the first end of the linkage includes a pawl that selectively engages the inclined teeth of the ratchet gear.

18. The computer mouse of claim 14, wherein the gear assembly has an overall reduction ratio of X:1, where X is greater than or equal to 500.

19. The computer mouse of claim 14, wherein the motor is configured to automatically change the at least one of the size, the shape, the orientation, or the position of the at least the portion of the housing by automatic change of at least one of:
    a height of the housing between a first height and a second height during the use of the computer mouse,
    a length of the housing between a first length and a second length during the use of the computer mouse, or
    a width of the housing between a first width and a second width during the use of the computer mouse.

20. A method to facilitate prevention or alleviation of a repetitive motion disorder, the method comprising:
    receiving operating power; and
    automatically changing at least one of a size, a shape, an orientation, or a position of at least a portion of a housing of a computer mouse ergonomically and repeatedly, during use of the computer mouse, by using the operating power, wherein:

the computer mouse includes a motor configured to effect automatic changes to the at least the portion of the housing, receiving the operating power includes deriving the operating power to operate the motor from movement of the computer mouse during the use of the computer mouse, and deriving the operating power to operate the motor comprises:

swinging a pendulum of the motor in response to a lateral acceleration of the computer mouse;

converting the swinging of the pendulum to a rotation of a lever; and converting the rotation of the lever to a displacement of a first portion of the housing with respect to a second portion of the housing.

21. The method of claim 20, wherein converting the swinging of the pendulum to the rotation of the lever comprises:

displacing a linkage coupled between the pendulum and an input of a gear assembly in response to the swinging of the pendulum; and rotating a cam coupled to an output of the gear assembly, the cam being in sliding contact with the lever.

22. The method of claim 21, wherein:

the lever has a first end in sliding contact with the cam and a second end coupled to a rigid top plate of the housing, the computer mouse further includes a support coupled to the lever at an axis of rotation of the lever, the support is coupled to a base of the housing, the axis of rotation of the lever is positioned between the first end and the second end of the lever, and converting the rotation of the lever to the displacement of the first portion of the housing with respect to the second portion of the housing comprises at least one of:

rotating the second end of the lever away from the base in response to the first end of the lever rotating toward the base such that a distance between the rigid top plate and the base increases, or rotating the second end of the lever toward the base in response to the first end of the lever rotating away from the base such that the distance between the rigid top plate and the base decreases.

* * * * *